(12) United States Patent
Addy

(10) Patent No.: US 6,288,639 B1
(45) Date of Patent: Sep. 11, 2001

(54) LOW POWER INSTALLATION OF WIRELESS SECURITY SYSTEM DEVICES

(75) Inventor: Kenneth L. Addy, Massapequa, NY (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/063,753

(22) Filed: Apr. 21, 1998

Related U.S. Application Data

(63) Continuation-in-part of application No. 08/516,162, filed on Aug. 17, 1995.
(60) Provisional application No. 60/044,509, filed on Apr. 21, 1997.

(51) Int. Cl.[7] .................................................. G08B 1/08
(52) U.S. Cl. ........................ 340/539; 340/506; 340/505; 340/825.06; 340/825.07
(58) Field of Search .................................. 340/506, 505, 340/531, 825.06, 825.07, 539

(56) References Cited

U.S. PATENT DOCUMENTS

| 4,367,557 | * | 1/1983 | Stern et al. ................ 340/825.71 X |
| 4,754,261 | | 6/1988 | Marino ............................... 340/514 |
| 5,461,365 | | 10/1995 | Schlager et al. .................. 340/573.1 |
| 5,828,300 | | 10/1998 | Addy et al. ......................... 340/539 |

FOREIGN PATENT DOCUMENTS

O 733 988 A2  9/1996  (EP).
WO 91/14244  3/1991  (WO).

* cited by examiner

Primary Examiner—Daryl Pope
(74) Attorney, Agent, or Firm—Greenberg Traurig; Anthony R. Barkume

(57) ABSTRACT

A method for ensuring that an adequate signal margin exists between an alarm system's central control unit and its wireless devices during normal operation. The wireless devices include a remote dialer, a remote siren, and a user interface device. During installation of the alarm system, the installer locates the central control unit and the wireless device being installed. An alarm condition is simulated, and an alarm message is transmitted by the central control unit's transmitter at a power level lower than the power level during normal operation. The wireless device indicates if it has successfully received the alarm message, or if it has not, it is relocated and the alarm condition is simulated again until the wireless device indicates that it has received the alarm message. The installer knows there will be adequate signal margin between the central control unit and the wireless device during normal operation when the low power alarm message has been received by the wireless device. Also, the reduced central transmitter output power may be coincident with reduced central receiver sensitivity allowing the installer to ensure adequate system signal margin in both up and down links.

49 Claims, 4 Drawing Sheets

LOW POWER INSTALLATION OF WIRELESS SECURITY SYSTEM DEVICES

CROSS-REFERENCE TO RELATED APPLICATION

This patent application is a continuation-in-part of co-pending U.S. application Ser. No. 08/516,162, which was filed on Aug. 17, 1995, which is incorporated by reference herein. This application also claims priority of co-pending U.S. provisional application serial no. 60/044,509, which was filed on Apr. 21, 1997.

BACKGROUND OF THE INVENTION

The present invention relates to wireless alarm systems having multiple alarm devices in communication with one or more control units, the control unit containing a system controller, receiver and transmitter; and in particular to such alarm systems where the control unit transmits messages to a wireless user interface device(such as a keypad and display), wireless remote siren and/or wireless remote dialer that indicate an alarm or change of status condition.

A recent innovation in security applications is the use of two-way wireless user interface devices, which are keypads or panic transmitters with system status indicators. These are portable devices, which may be used to control and interrogate the security system for system status. An example of such devices are the 5827BD and 5804BD products available from ADEMCO in Syosset, N.Y. These have the advantages of portability if required, or alternatively may be mounted at an installation, thus reducing the high costs of wiring a conventional wired user interface device. In addition, wireless remote sirens and dialers may be employed to reduce wiring and labor costs.

Typically during alarm system installation, a conventional central control unit is placed into an installation mode and its receiver sensitivity is reduced (see U.S. Pat. No. 4,754,261). This allows the installer to check the transmission signal margin of the alarm devices, i.e. window sensors, door sensors, etc. If the central control unit recognizes an alarm flag from the alarm device at reduced receiver sensitivity, then there will be adequate signal margin during normal operation. That is, if the radio environment changes during normal operation, due to movement of furniture etc., the alarm signals transmitted from the alarm devices have sufficient signal strength to be received by the central control unit receiver in this changed, adverse condition.

In the case where a wireless user interface device with signal receiver capabilities is being installed, ensuring an adequate signal margin between the central control unit transmitter and the wireless user interface device is typically more difficult because the wireless user interface devices currently may not be designed with a keypad selection or a switch to reduce their input sensitivity. It would be advantageous, when the central control unit receiver goes into installation mode (reduced sensitivity), at that same time to place the central control unit transmitter into reduced output power mode, thus obtaining an adequate signal margin in both the up link (user interface device to central control unit receiver) and down link (central control unit transmitter to user interface device).

It is also desirable to ensure that the wireless remote siren and dialer are installed with adequate signal margin so that if the radio environment changes during normal operation, the messages from the central control unit transmitter have sufficient signal strength to be received by the wireless remote device in this changed, adverse condition.

It is therefore an object of the present invention to provide a method for ensuring that an adequate signal margin exists between the central control unit and the wireless devices during an alarm system installation.

It is also an object of the present invention to provide an alarm system that provides means for transmitting between a central control unit and a wireless device at a reduced transmission level during installation mode and at a normal transmission level while not in installation mode.

It is yet a further object of the present invention to provide a common installation mode to verify communication between the central control unit and the wireless alarm devices (window sensors, door sensors, etc.) and at the same time verify communication between the central control unit and the wireless devices having receive capability (user interface devices, remote siren, and remote dialer).

SUMMARY OF THE INVENTION

In accordance with these and other objects, the present invention is a method for ensuring that an adequate signal margin exists between an alarm system's central control unit and its wireless devices. The wireless devices include a remote dialer, a remote siren, and optimally a user interface device such as a two-way(transmit and receive) portable keypad. This method typically is used during installation, which is initiated by manual input means at the central control unit and/or by selecting a user input code at the user interface device. The important feature of this method is that the central transmitter is put in a reduced power mode upon initiation of the installation mode.

During installation mode, the installer causes the central transmitter to transmit messages at low power and checks to see if the devices being installed take appropriate action. For example, while installing a user interface, the installer would request status from the central controller by entering user input codes into the user interface. The central transmitter would then transmit a status message at low power back to the user interface, which would display the status upon receipt. When the installer is locating wireless devices which do not display status, such as a remote siren, the installer would simulate an alarm condition by activating a manual input means, a sensor device or a user interface device such as a panic button. This causes an alarm received message to be transmitted at a reduced power level from the central transmitter to the wireless device being installed, which would take appropriate action upon receipt (i.e. activate siren).

When the wireless device does not indicate that it has successfully received the reduced power message, then the wireless device is relocated by the installer and a reduced power message is retransmitted to the wireless device. The installer continues this process until the wireless device indicates that it has successfully received a reduced power message. A reduced power level of approximately 12 dB ensures that the wireless device is installed with adequate signal margin for normal operation.

In addition, reduced central transmitter output power may be coincident with reduced central receiver sensitivity. The installer can conveniently ensure system signal margin in both up and down links by triggering or simulating an alarm condition at an alarm device (i.e. opening a window) and checking that the wireless devices indicate an alarm condition.

Finally when the installation is completed, the installer goes into normal operation mode by initiating manual input means at the central control unit or by selecting a user input code for normal operation at a wired or wireless user interface device. There is also a safety feature that ensures the alarm system will not be left in install mode by the installer. An install timer, which is set upon entering the install mode, causes the alarm system to go back into normal mode after a predetermined amount of time.

The present invention is embodied by an alarm system comprising a central control unit with a transmitter and a plurality of wireless devices with means for receiving messages from the central transmitter. The central control unit operates in both a normal mode and an install mode. The central transmitter provides means for transmitting at two different output power levels, the output being transmitted at a higher power level during normal operation, and the output being transmitted at the lower power level during an installation mode. The central transmitter broadcasts, electromagnetically such as by radio frequency (RF) or infrared (IR) means, alarm received messages and other status and control messages to the wireless devices. The wireless devices comprise receiving means for receiving messages from the central transmitter and indication means for indicating when the message has been successfully received. The indicating means may be an audible sound from a remote siren, activation of a remote dialer, and/or a visual display or audible sound from a user interface device. The wireless device is relocatable with respect to the central transmitter, at least until permanently mounted by the installer.

The present invention is based on the ability to control the radiated power of the central transmitter. The central transmitter has two distinct operating modes under the control of a processor; normal output power and reduced output power. Upon initiation of the install mode, the processor outputs a control signal, causing a reduced central transmitter output power level. This transmitter includes simple, cost effective circuitry. Those skilled in the art will recognize that control of transmitter output power may be achieved in alternate ways, although the method described offers a good low cost solution.

The central control unit may comprise an install mode switch to activate or deactivate (normal mode) the installation mode, an alarm switch to initiate an alarm received message transmission, and central receiver to receive commands transmitted by a user interface device and alarm activation signals transmitted by alarm devices. The central receiver may also provide means for receiving at two different input sensitivity levels, the input sensitivity being higher during normal operation, and the input sensitivity being lower during an installation mode.

Alarm devices such as smoke, motion, breaking glass, shock and vibration detectors; door, window and floor mat switches; etc. transmit alarm activation signals when activated. The central receiver receives the alarm activation signals causing the central system controller to transmit via the central transmitter an alarm received message to the wireless devices.

A user interface device, which may be a wall mounted (wired or wireless) or a hand-held transceiver device, comprises input means for entering status changes, status requests, and commands such as an install mode command or a normal mode command. The user interface device also comprises transmission means for transmitting the messages and commands to the central receiver. The user interface device also comprises receiving means for receiving status messages from the central transmitter and status output means such as an audible sound and/or a visual display. The user interface device may also provide means for transmitting an alarm activation signal to the central receiver.

This invention provides a unique method of accomplishing the stated objectives without compromising the simplicity of the wireless devices or complicating the installation process.

DETAILED DESCRIPTION OF THE PREFERRED EMBODIMENT

Figure 1:
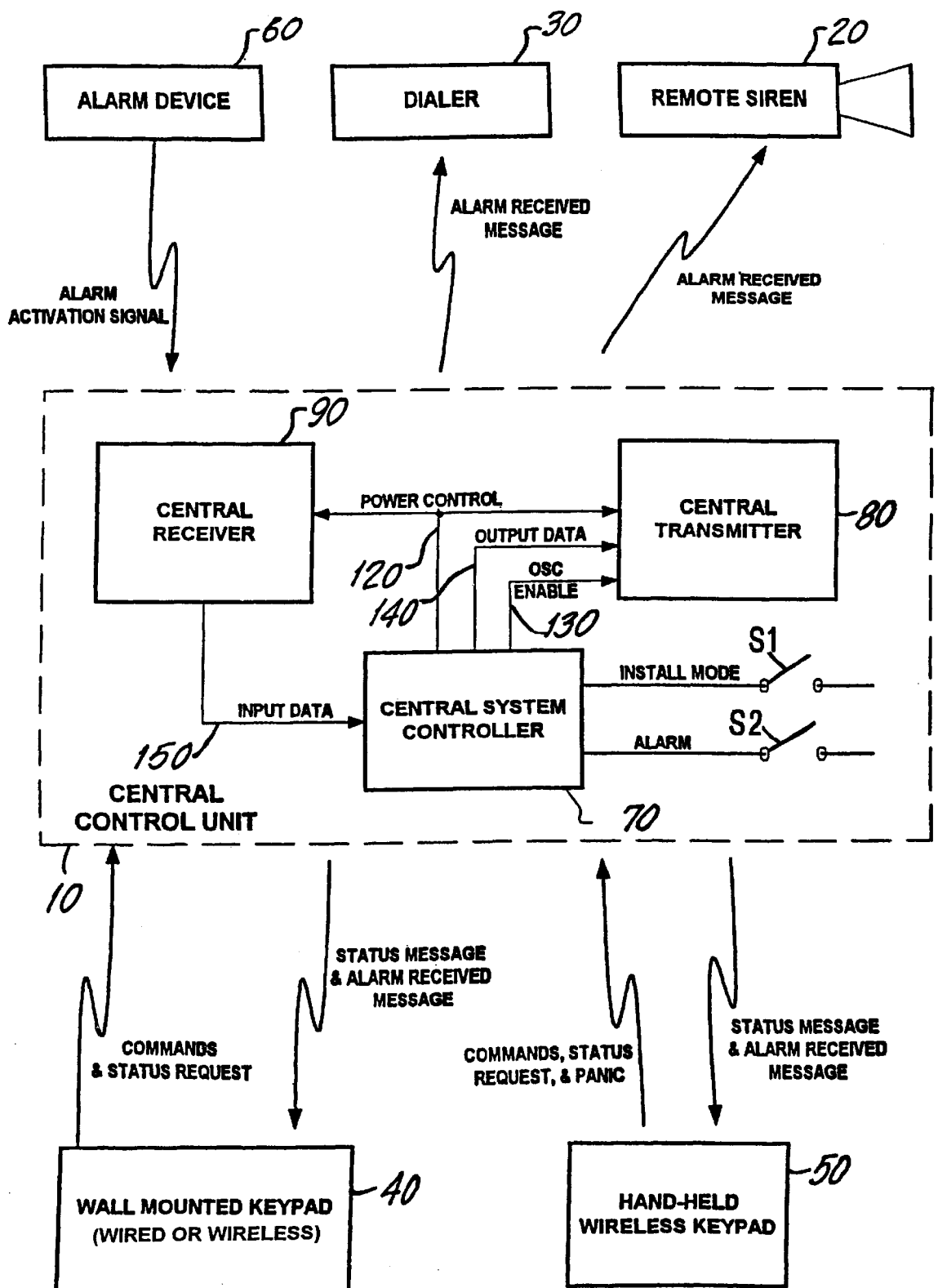
FIG. 1 is a block diagram of a preferred embodiment alarm system of the present invention.

FIG. 1 shows a typical alarm system 5 including a central control unit 10 comprising a central system controller 70, a central receiver 90 and a central transmitter 80. The alarm system 5 also comprises a plurality of alarm devices 60, which refer generically to any or all of various types of alarm detection devices such as glass break detectors, door opening detectors, etc. The alarm system 5 also comprises a user interface device in the form of a wall mounted keypad 40, which maybe wired to the central receiver and the central transmitter. The wall mounted keypad 40 may also be wireless, such as an ADEMCO 5827BD, transmitting to the central transmitter and receiving from the central receiver via RF transmission. The wall mounted keypad (wired or wireless) allows the user to input system options by selecting specific user codes, and view system status through visual and audio means. The system also may include a user interface device in the form of a hand-held wireless keypad 50, such as the ADEMCO 5804BD, which allows the user to arm or disarm the alarm system 5, trigger an alarm, determine alarm system status, and display status through visual and audio indicators. The alarm system 5 also includes a wireless remote siren 20 and a remote dialer 30.

As well known in the art, during an alarm condition, the central receiver 90 receives Alarm Activation Signals from the alarm device 60 or the hand-held wireless keypad 50 (e.g. a panic signal). The central system controller 70 then analyzes the Alarm Activation Signals and determines if an alarm condition truly exists. If an alarm condition does exist, the central transmitter 80 broadcasts an Alarm Received Message to the wireless remote siren 20, wireless dialer 30, hand held wireless keypad 50 and wall mounted keypad 40.

The receiver 90 receives status requests, install mode commands and other commands from the wall mounted keypad 40 which is part of the invention herein. The transmitter 80 transmits status messages when the receiver receives a status request. Details regarding the protocol of the transmission of commands and status between the wired or wireless devices and the central control unit are already well known to someone skilled in the art.

During installation, the installer typically mounts the central control unit 10 in a remote hidden location because it is important to limit access from an intruder and it is rather large and unsightly. He then installs the wall mounted keypad 40, on the wall of the building by an entrance. In order to keep components of one alarm system from communicating with components of different alarm system (i.e. setting the alarm of the house next door) a site ID is embedded in each device's transmission. The wall mounted keypad 40 requests the site ID (during installation programming mode) to be transmitted from the central control unit 10. If the cover of the central control unit 10 has been removed (a safety feature which allows the site ID to be sent only during installation) the site ID is transmitted by the central control unit 10. The site ID is programmed into EEPROM in the central control unit 10 at the factory. Along with the site ID, the wall mounted keypad 40 receives a device address, which is necessary for communication with the central control unit 10. The messages to and from the central control unit 10 also contain this address allowing the central control unit 10 to decode which alarm device sent the message. The details of how a device learns the site ID and device address are well known in the art and are not described here.

Next the installer enters a command, such as a status request, into the wall mounted keypad 40 and checks to see that the wall mounted keypad 40 displays the status. This insures communication between the wall mounted keypad 40 and the central control unit 10. The installer then enters the install command into the wall mounted keypad 40 (which is transmitted to the central system controller 10) or activates install mode switch S1 to indicate to the central system controller 10 that a Power Control Signal 120 should be at a logic level 0. The Power Control Signal is connected via wires from the central system controller 70 to both the central receiver 90 and the central transmitter 80 and causes both the central receiver 90 and the central transmitter 80 to go into a reduced power install mode. The reduced power install mode causes the central receiver 90 to receive signals at a power level of approximately 12 dB lower than its normal level by reducing its sensitivity and the central transmitter 80 to transmit messages at a power level also of approximately 12dB lower than its normal level.

The Power Control Signal also sets a timer in the central system controller. The timer is a safety feature, which causes the alarm system to go back into normal mode after a predetermined amount of time if the installer forgets to return the alarm system back into normal mode manually.

If the wall mounted keypad 40 is wireless, the installer will recheck its communication with the central control unit 10 by entering a status request user code at the wall mounted keypad 40, which is transmitted to the central receiver 90. If the status request message is received by the receiver, now at low power, the central transmitter 80 will transmit a status message to the wall mounted keypad 40 also at low power. The installer will then check to see if the status message is received and displayed by the wall mounted keypad 40. If not the installer relocates the wall mounted keypad 40 and rechecks its communication in the same way.

The installer then mounts a wireless device, such as remote siren 20, on the outside of the building (or inside in an attic for example). The site ID and the device address are learned by the wireless device in the same manner as the wall mounted keypad. A convenient way to test for adequate signal margin between the central control unit 10 and the wireless device is to simulate the presence of an alarm condition and check to see if the wireless device takes appropriate action. To simulate the presence of an alarm condition, the installer activates switch S2 which causes the central system controller 70 to generate an alarm received message. The alarm received message is transmitted by the central transmitter 80 at a reduced power to the remote siren 20. If the remote siren 20 receives the message and performs its function (i.e. sounds an audible tone), the installer knows the remote siren 20 has been installed with adequate signal margin. If the remote siren 20 does not perform its function, the installer will relocate the remote siren 20 (i.e. move it closer) and retest by activating alarm switch S2. The process can be repeated until the siren is successfully heard, thus ensuring an adequate signal margin during normal operation mode. Finally, the installer will turn the remote siren 20 off using key codes at the wall mounted keypad 40.

Once the installer locates the proper position of the first wireless device, he performs the entire process again for each wireless device, i.e. the remote dialer 30, and/or the hand held wireless keypad 50. Alternatively, all devices can be located/installed at the same time by this methodology. The processes would be the same for each wireless device except that the installer would be looking for different outputs. For example, the remote dialer's 30 output would be telephone transmission of alarm information to a security station and the hand held wireless keypad's 50 output would also be display of an alarm code and/or sounding of an audible alarm signal.

The installer then installs the alarm devices 60 and checks the entire system operation by raising an alarm at the device 60, such as by opening a window. The alarm device 60 transmits the Alarm Activation Signal, which is received at reduced power by the central receiver 90. The input data from the central receiver is processed by the central system controller. The central system controller 70 sends output data 140 to the central transmitter 80. The central transmitter 80 broadcasts the Alarm Received Message at reduced power to the wireless devices. Lastly, the wireless devices take appropriate action and indicate by visual or audible means that they have received an Alarm Received Message. At this point the installer knows that there is adequate signal margin in both the up and down links.

The installer then exits the install mode via a keyed command from the wall mounted keypad 40. The central system controller 70 sets the Power Control signal 120 to a logic level 1. This causes the central receiver 90 to receive at normal power and the central transmitter 80 to transmit at normal power. Thus all messages are conveyed during normal operation at a signal margin above that which was used during installation.

Those skilled in the art will recognize that there are many variations to installing an alarm system and the one described here may be performed in other ways. For example, using the alarm device 60 or the hand held wireless keypad 50 to transmit an Alarm Activation Signal to cause the Alarm Received Message to be generated by central system controller 70 rather than alarm switch S2.

The significance of the present invention is the ability to reduce output power of the central transmitter 80 during the alarm system installation to insure that adequate signal margin exists in normal operation mode. It will be apparent to those skilled in the art that the transmitted messages may be formatted in many different ways, and that the invention is not dependent on a particular format. Also the design of the remote siren 20, the remote dialer 30, the hand held wireless keypad 50, the wall mounted keypad 40, and the alarm devices 60 are well know in the art and do not need to be described.

Figure 2:
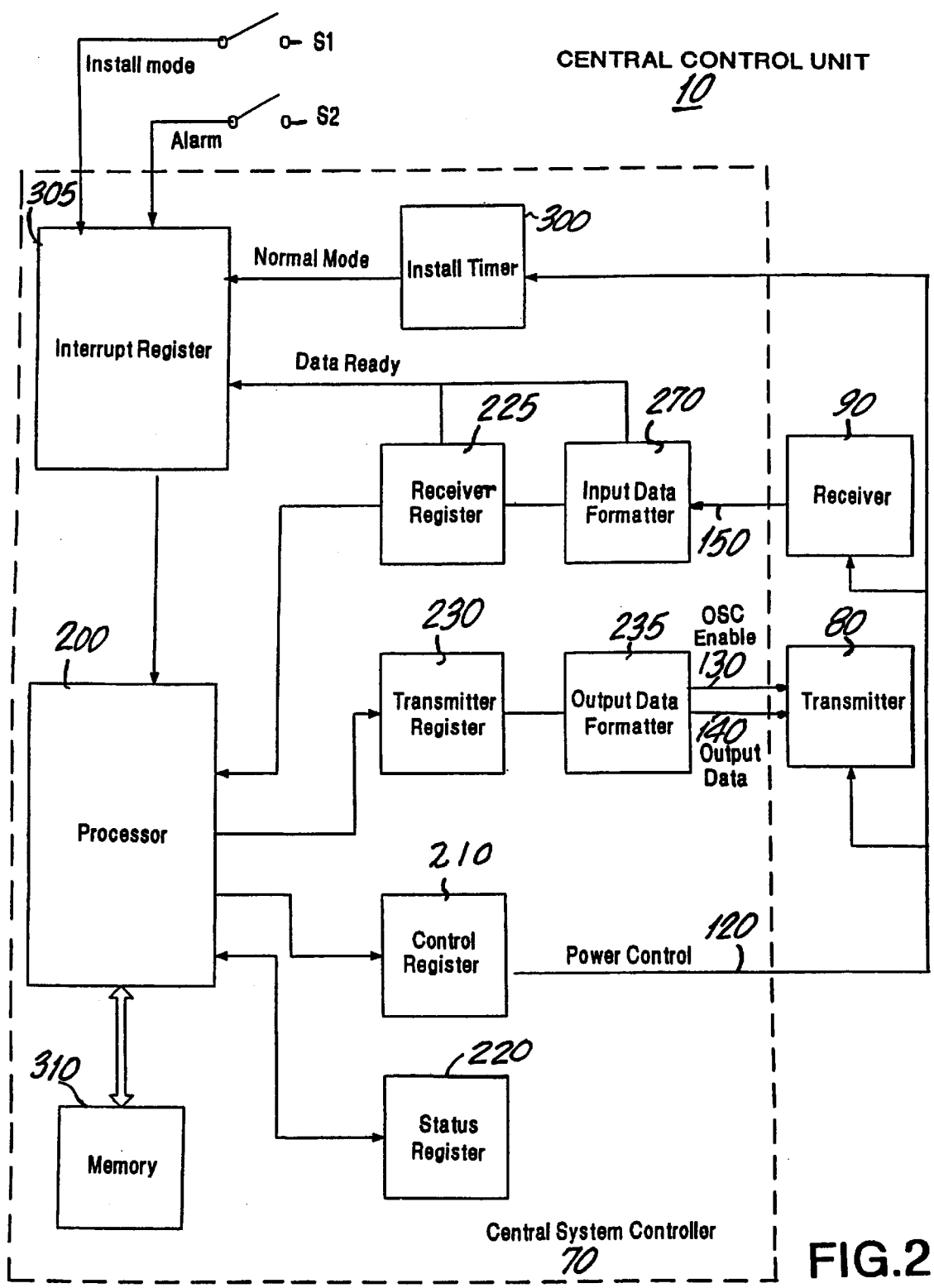
FIG. 2 is a block diagram of the central control unit of FIG. 1.

FIG. 2 shows the central control unit 10 block diagram. Shown is the transmitter 80, the receiver 90, the install mode switch S1, alarm switch S2, and the central system controller 70. The central system controller 70 includes a processor 200 and its supporting digital logic, which includes memory 310 (RAM and ROM), interrupt register 305, status register 220, control register 210, and data registers. The data registers include receiver register 225, and transmitter register 230. The receiver register 225 accepts data from the input data formatter 270. The input data into the input data formatter 270 is from the receiver 90. The input data formatter 270 comprises digital logic, which also provides a Data Ready signal to the receiver register 225 and the interrupt register 305. The transmitter register 230 outputs its data to the output data formatter 235 comprised of digital logic, which supplies the output data 140 and the osc enable 130 signal to the transmitter 80.

The interrupt register 305 receives four interrupts, data ready, install mode, alarm, and normal mode. The data ready interrupt signals the processor 200 to read input data from the receiver register 225. The install mode switch S1 interrupt signals the processor 200 go into install mode. The alarm switch S2 interrupt signals the processor 200 to output an alarm received message through the transmitter register 230. Lastly, normal mode interrupt from Install Timer 300 signals the processor 200 to go into normal mode from install mode.

The status register 220 storage includes the status of the wireless devices, the status of enable alarm, and the mode, normal or install. Lastly, the control register 210 controls the input and output power level of the receiver 90 and the transmitter 80, via the power control signal 120. This signal also initiates the install timer 300.

The details of the operation of each specific circuit are well known to those skilled in the art and are not described.

Figure 3:
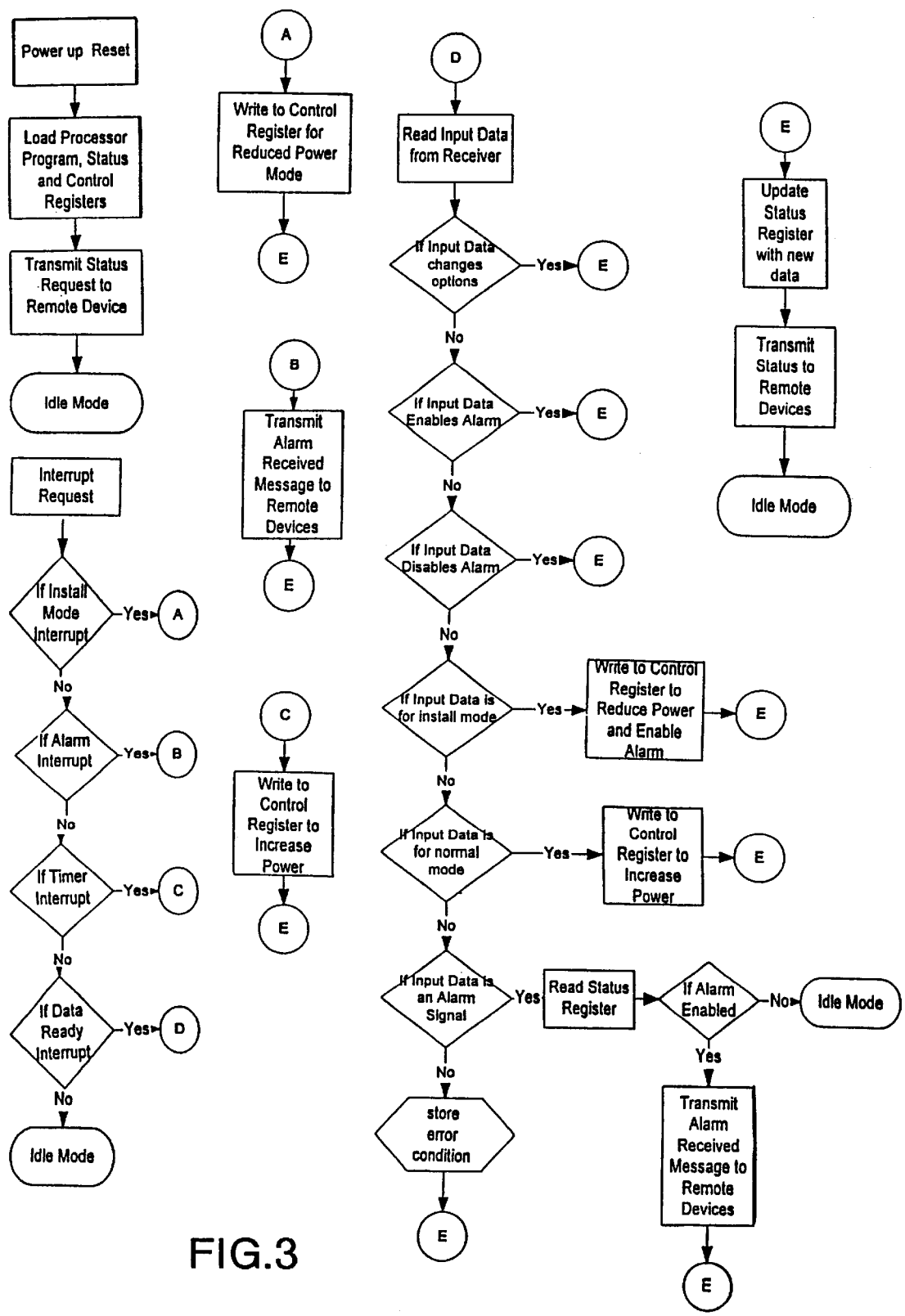
FIG. 3 is a flow chart of the processing utilized by the central control unit.

FIG. 3 shows the flow chart of the central system controller 70. Upon Power up Reset the processor, 200 in FIG. 2, performs a typical start up routine such as loading he processor program, resetting hardware and loading the control register. This is well known to those skilled in the art. The processor 200 also transmits a status request to the wireless devices and goes into an idle mode to wait for an interrupt. Upon an interrupt request, the processor 200 performs an interrupt routine which includes reading the interrupt register 305. If the processor 200 determines the interrupt was from the install mode Switch S1, it writes to the control register 210 changing the logic level of the Power Control signal 120 from a logic 1 to a logic 0. If the processor 200 determines the interrupt was from the alarm switch S2, it transmits an alarm received message to the wireless devices via transmitter register 230. If the processor 200 determines the interrupt was from the timer, it writes to the control register 210 changing the logic level of the Power Control signal 120 from a logic 0 to a logic 1. Lastly, if the processor 200 determines the interrupt was from the data ready interrupt, it reads the data from the receiver register 225. The input data is decoded, and the processor 200 determines if there should be a change in the options stored by the status register 220, if the alarm mode should be enabled or disabled, if the transmitter and receiver should be in the reduced power installation mode or the normal power mode, or if the input data is an alarm signal. If the input data is an alarm signal, the status register 220 is read to determine if the alarm mode is enabled. If it is not enabled, the transmission is ignored. If it is enabled, the processor 200 transmits an alarm received message to the wireless devices via the transmitter register 230. If the input data is erroneous an error is stored in the status register 220, and a message is transmitted to the wireless devices. The status register 220 is also updated after any changes have been performed to the alarm system and status messages are sent to the devices. The details of each processing step would be well known to someone skilled in the art. This flow chart does not include all the processes necessary for an alarm systems total operation, only processes pertinent to the present invention.

Figure 4:
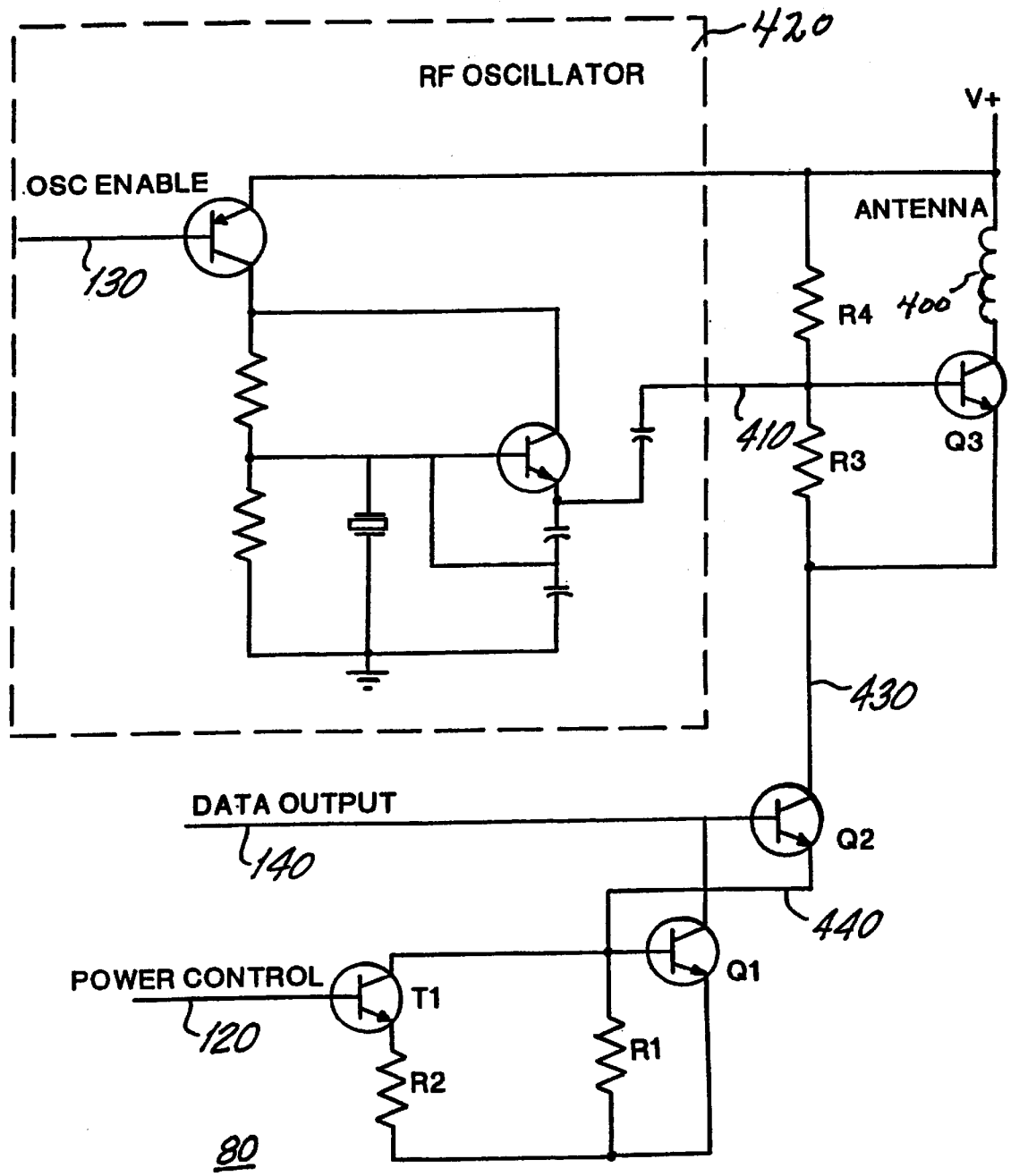
FIG. 4 is a schematic of the central transmitter of FIG. 1.

FIG. 4 shows a detailed implementation of the power control feature of the central transmitter 80. The central transmitter 80 output, from antenna 400, is controlled by power amplifier Q3. Decreased current through Q3 causes decreased output transmission power. The current through Q3 is controlled by three sources: current source 440, data signal 430 and RF signal 410. The current source 440, which is equal to the current through R1, is controlled by the Power Control signal 120. When the Power Control signal 120 is at a logic level 1, R2 is active and the current through R1 is increased. When the Power Control signal 120 is at a logic level 0, R2 is switched out of the circuit via T1, and the current through R1 is decreased.

The data signal 430 modulates Q3 according to the logic level of Data Output signal 140, and the RF signal 410 is amplified by Q3. The RF is from RF oscillator 420, which is enabled by the Osc Enable signal 130. RF modulation of data signals and the electrical components of this circuit are well known to one skilled in the art.

Thus while the particular embodiments of the present invention have been shown and described, various modifications will be apparent to those skilled in the art, and therefore it is not intended that the invention be limited to the disclosed embodiment or to details thereof and departures may be made therefrom within the spirit and scope of the present invention.

What is claimed is:

1. A method for installing an alarm system comprising the steps of:
    a) initiating an install mode in a central control unit,
    b) transmitting from a transmitter a message at a reduced power amplitude level with respect to a normal operating power amplitude level,
    c) receiving, at a wireless device, said reduced power message, said wireless device being relocatable with respect to said transmitter, and,
    d) indicating when said reduced power message is successfully received,
    when said reduced power message is not successfully received, then:
    e) relocating said wireless device,
    f) transmitting from said transmitter a message at a reduced power amplitude level with respect to a normal operating power amplitude level,
    g) receiving, at said wireless device said reduced power message, and,
    h) indicating when said reduced power message is successfully received.

2. The method of claim 1 wherein the step of initiating an install mode in a central control unit is performed by the steps of entering an install command into a user interface device, and sending an install message from said user interface device to said central control unit.

3. The method of claim 1 wherein the step of initiating an install mode in a central control unit is performed by activating a manual input device at said central control unit.

4. The method of claim 1 wherein the reduced power message is a reduced power alarm received message.

5. The method of claim 1 wherein the reduced power message is a reduced power status message.

6. The method of claim 4 wherein the step of transmitting an alarm received message is in response to activation of a manual input means at said central control unit.

7. The method of claim 4 wherein the step of transmitting an alarm received message is in response to a receipt of an alarm activation signal from a device.

8. The method of claim 7 wherein said alarm activation signal is received by a receiver at reduced sensitivity.

9. The method of claim 5 wherein the step of transmitting a reduced power status message is in response to a receipt of a status request message from a user interface device.

10. The method of claim 9 wherein said status request message is received by a receiver at reduced sensitivity.

11. The method of claim 1 wherein said reduced power message is transmitted at a power level that is approximately 12 dB lower than said normal operating power level.

12. The method of claim 4 wherein said indication that said reduced power alarm received message is successfully received is performed by activating an audible siren.

13. The method of claim 4 wherein said indication that said reduced power alarm received message is successfully received is performed by activating a remote dialer device.

14. The method of claim 4 wherein said indication that said reduced power alarm received message is successfully received is performed by indicating alarm status at a user interface device.

15. The method of claim 14 wherein said indication of alarm status at a user interface device is an audible sound.

16. The method of claim 14 wherein said indication of alarm status at a user interface device is a visual display.

17. The method of claim 5 wherein said indication that said reduced power status message is successfully received is performed by indicating the status of a central control unit at a user interface device.

18. The method of claim 17 wherein said indication of status at said user interface device is a visual display.

19. The method of claim 1 wherein said transmission of said reduced power message to said wireless device is an electromagnetic transmission.

20. The method of claim 1 further comprising the step of:
   subsequently initiating a normal operation mode in said central control unit.

21. The method of claim 20 wherein the step of initiating a normal operation mode in said central control unit is in response to activation of a manual input means at said central control unit.

22. The method of claim 20 wherein the step of initiating a normal operation mode in said central control unit is performed by the steps of entering an normal operation mode command into a user interface device, and sending said command from said user interface device to said central control unit.

23. The method of claim 20 wherein the step of initiating a normal operation mode in said central control unit is in response to completion of a time interval.

24. A alarm system comprising:
   a) a central control unit adapted to operate in an install mode, said central control unit comprising transmission means for transmitting during said install mode a message at a reduced power amplitude level with respect to a normal operating power amplitude level, and
   b) a wireless device comprising:
      (i) a receiver for receiving said reduced power message, and,
      (ii) means for indicating when said reduced power message is successfully received,
         said wireless device being relocatable with respect to said transmitter means,
further comprising a user interface device, said user interface device comprising input means for entering user input codes, wherein said wireless user interface device further comprises receiving means adapted for receiving said reduced power message, and a status output means for indicating when said reduced power message is successfully received.

25. The system of claim 24 wherein said user interface device is adapted to initiate said install mode in said central control unit.

26. The system of claim 24 wherein said user interface device is adapted to request status from said central control unit.

27. The system of claim 24 wherein said user interface device is wireless and further comprises output means for sending a message from said wireless user interface device to said central control unit, and wherein said central control unit further comprises means for receiving said message from said user interface device.

28. The system of claim 27 wherein said message is an install mode command which initiates said install mode in said central control unit.

29. The system of claim 27 wherein said message is a status request message which initiates said central control unit to transmit a status message.

30. The system of claim 24 wherein said central control unit further comprises a first manual input means adapted to initiate said install mode.

31. The system of claim 24 wherein said central control unit further comprises a second manual input means adapted to initiate a transmission of an alarm received message from said transmission means to said wireless device receiver.

32. The system of claim 24 wherein said central control unit further comprises means for receiving an alarm activation signal, wherein said alarm activation signal initiates a transmission of an alarm received message from said transmission means to said wireless device receiver.

33. The system of claim 24 further comprising a sensor device adapted to transmit said alarm activation signal.

34. The system of claim 24 wherein receiving means is adapted to receive an alarm activation signal at reduced sensitivity during said install mode.

35. The system of claim 29 wherein receiving means is adapted to receive status request messages at reduced sensitivity during said install mode.

36. The system of claim 24 wherein said transmission means transmits at a power level that is approximately 12dB lower than said normal operating power level.

37. The system of claim 24 wherein said means for indicating when said reduced power alarm received message is successfully received is an audible siren.

38. The system of claim 24 wherein said means for indicating when said reduced power alarm received message is successfully received is a remote dialer device.

39. The system of claim 24 wherein said status output means is an audible sound.

40. The system of claim 24 wherein said status output means is a visual display.

41. The system of claim 24 wherein said wireless device is a wireless hand-held user interface device, and wherein said means for indicating when said reduced power message is successfully received is a status output means.

42. The system of claim 41 wherein said status output means outputs an audible sound.

43. The system of claim 41 wherein said status output means is a visual display.

44. The system of claim 24 wherein said central control unit comprises a processor, said processor being adapted to output a control signal to said transmission means upon initiation of said install mode to reduce said transmission means output power level.

45. The system of claim 44 wherein said central control unit further comprises means for receiving an alarm activation signal, wherein said alarm activation signal initiates a transmission of an alarm received message from said transmission means to said wireless device receiver, and wherein said wireless hand-held user interface device is adapted to transmit said alarm activation signal.

46. The system of claim 24 wherein said message transmission, from said transmission means to said wireless device, is an electromagnetic transmission.

47. The system of claim 24 wherein said user interface device is further adapted to initiate a normal operation mode in said central control unit.

48. The system of claim 30 wherein said first manual input means is further adapted to initiate a normal operation mode in said central control unit.

49. The system of claim 24 further comprising a timing means adapted to initiate a normal operation mode in said central control unit upon completion of a time interval after initiation of said install mode.

* * * * *